(12) United States Patent
Zimmer et al.

(10) Patent No.: US 7,581,037 B2
(45) Date of Patent: Aug. 25, 2009

(54) EFFECTING A PROCESSOR OPERATING MODE CHANGE TO EXECUTE DEVICE CODE

(75) Inventors: Vincent J. Zimmer, Federal Way, WA (US); Michael D. Kinney, Olympia, WA (US); Michael A. Rothman, Puyallup, WA (US); Andrew J. Fish, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 441 days.

(21) Appl. No.: 11/081,238

(22) Filed: Mar. 15, 2005

(65) Prior Publication Data
US 2006/0212609 A1   Sep. 21, 2006

(51) Int. Cl.
*G06F 3/00*    (2006.01)
*G06F 9/00*    (2006.01)
*G06F 9/44*    (2006.01)
*G06F 15/177*  (2006.01)

(52) U.S. Cl. .................... 710/8; 710/9; 710/10; 710/12; 710/13; 710/14; 712/226; 712/229; 713/1; 713/2; 713/100

(58) Field of Classification Search ................. 710/226, 710/229, 8–10, 12–14; 712/226, 229; 713/1, 713/2, 100
See application file for complete search history.

(56) References Cited

U.S. PATENT DOCUMENTS

| | | | | |
|---|---|---|---|---|
| 5,671,422 A | * | 9/1997 | Datta | ........................ 710/261 |
| 5,946,469 A | * | 8/1999 | Chidester | ..................... 703/24 |
| 7,285,051 B2 | * | 10/2007 | Eguchi et al. | ................ 463/43 |
| 2001/0020269 A1 | * | 9/2001 | Kawade et al. | .............. 713/100 |
| 2001/0044891 A1 | * | 11/2001 | McGrath et al. | ............ 712/229 |
| 2004/0181700 A1 | * | 9/2004 | Katoh et al. | ................ 713/300 |
| 2004/0243862 A1 | * | 12/2004 | Ohishi et al. | ................ 713/300 |

OTHER PUBLICATIONS

Advanced Micro Devices, Inc., "BIOS and Kernal Developer's Guide for AMD Athlon 64 and AMD Opteron Processors", Sep. 2003, Publication # 26094, Revision 3.06.

Collins, R., "The Caveats of System Management Mode", [online], [retrieved on Feb. 11, 2005], Retrieved from the Internet at <URL: http://www.rcollins.org/ddj/May97/May97.html>.

(Continued)

*Primary Examiner*—Henry W. H. Tsai
*Assistant Examiner*—Kris Rhu
(74) *Attorney, Agent, or Firm*—Konrad Raynes & Victor LLP; David W. Victor

(57) ABSTRACT

Provided are a method, system and program for effecting a processor operating mode change to execute device code. A processor receives a call while the processor is operating in a first mode, wherein the call is made to effect execution of device code to control a device. The processor determines whether the call is intended to change a processor operating mode from the first mode to a second mode. The state of the processor is selectively changed to a second mode in which the processor executes second mode instructions loaded in a protected section of memory inaccessible to an operating system in response to determining that the call is intended to change the processor operating mode. The second mode instructions execute the device code to control the device.

25 Claims, 3 Drawing Sheets

OTHER PUBLICATIONS

Gorman, S., "Overview of the Protected Mode Operation of the Intel Architecture", [online], retrieved from the Internet at <URL: http://www.intel.com/design/interarch/papers/exc_ia.pdf>. [retrieved on Feb. 15, 2005].

Intel Corporation, "Extensible Firmware Interface Specification", Dec. 1, 2002, version 1.10, Intro through Ch. 10.

Intel Corporation, "Extensible Firmware Interface Specification", Dec. 1, 2002, version 1.10, Ch. 11 through 16.

Intel Corporation, "Extensible Firmware Interface Specification", Dec. 1, 2002, version 1.10, Ch. 17 through Index.

Intel Corporation, "Intel Architecture Software Developer's Manual", vol. 3: System Programming, 1999, Intro and Chs. 2, 12, & 16.

* cited by examiner

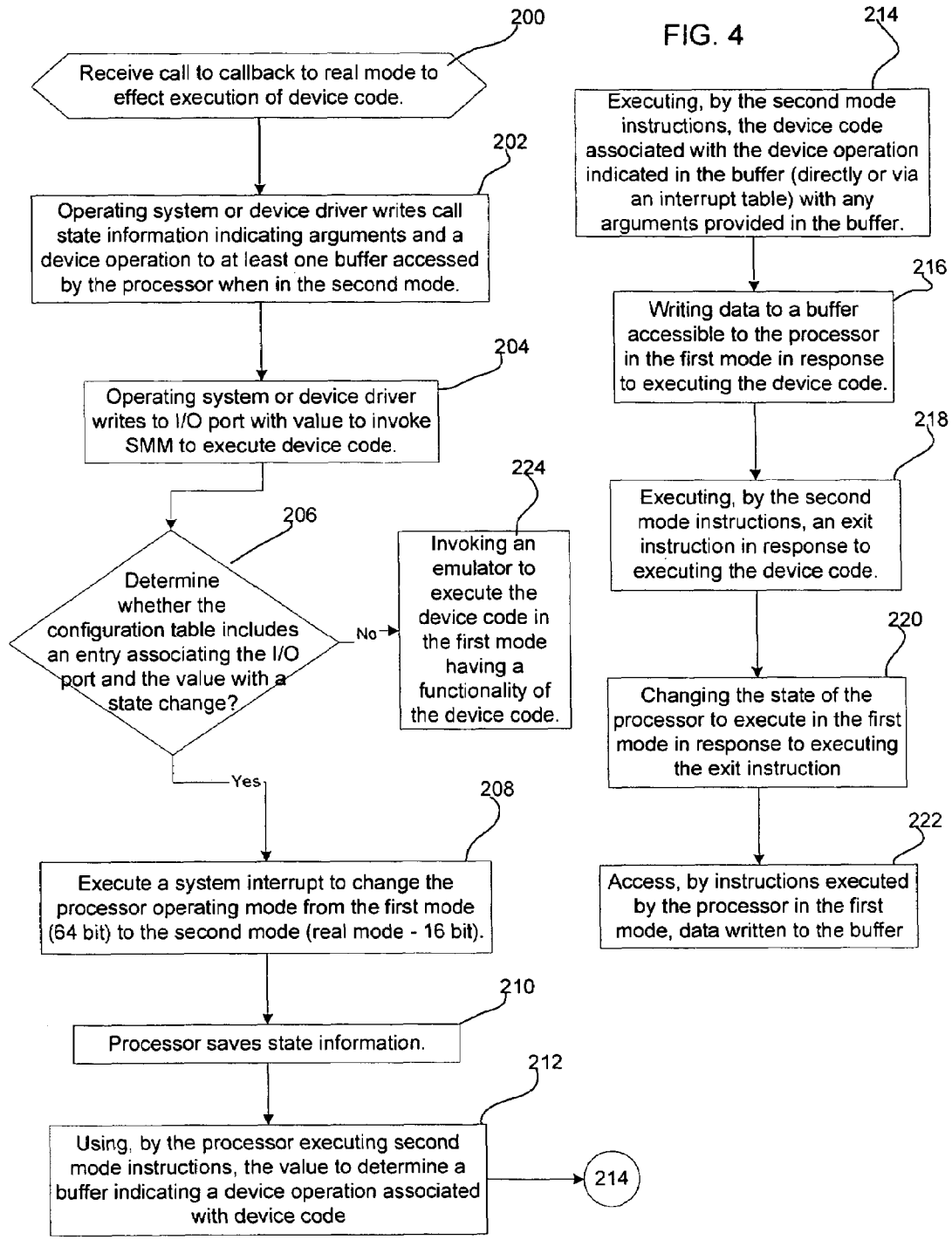

EFFECTING A PROCESSOR OPERATING MODE CHANGE TO EXECUTE DEVICE CODE

BACKGROUND

In the current 32 bit system processor architecture, an application may invoke the processor to execute code written for a 16 bit operating mode in a 16 bit operating mode. For instance, many devices include device code in their firmware, such as service routines and interrupts that are intended to be executed in a 16 bit environment. This device code may need to be called during operation in the 32 bit mode to control the device, such as change video settings in a video processor, etc.

The Intel Corporation 386 and above 32 bit processor architectures include a Virtual-8086 (V86) mode that emulates a 16 bit environment in which 16 bit instructions, such as device code, may be executed. The processor may switch between V86 mode and protected mode. The processors enters V86 mode from protected mode to execute 16 bit device code, such as an 8086 program, then leaves V86 mode and enters protected mode to continue executing a native 32 bit program, e.g., 80386 program. Further details of V86 mode are described in the publication "Intel Architecture Software Developer's Manual, Volume 3: System Programming" (Copyright Intel, 1999).

For the 64 bit architecture, emulators have been developed because V86 mode is not supported in the 64 bit architecture. Emulators allow execution of instructions intended for 16 bit real mode by emulating the real mode 16 bit device code as 64 bit instructions. Another option is to allow the 64 bit operating system transition to 32-bit protected mode in which the 16 bit mode execution can occur, but this entails having separate interrupt handlers and is costly from a systems and support perspective.

BRIEF DESCRIPTION OF THE DRAWINGS

FIG. 4 illustrates an embodiment of operations to change the state mode to execute device code.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
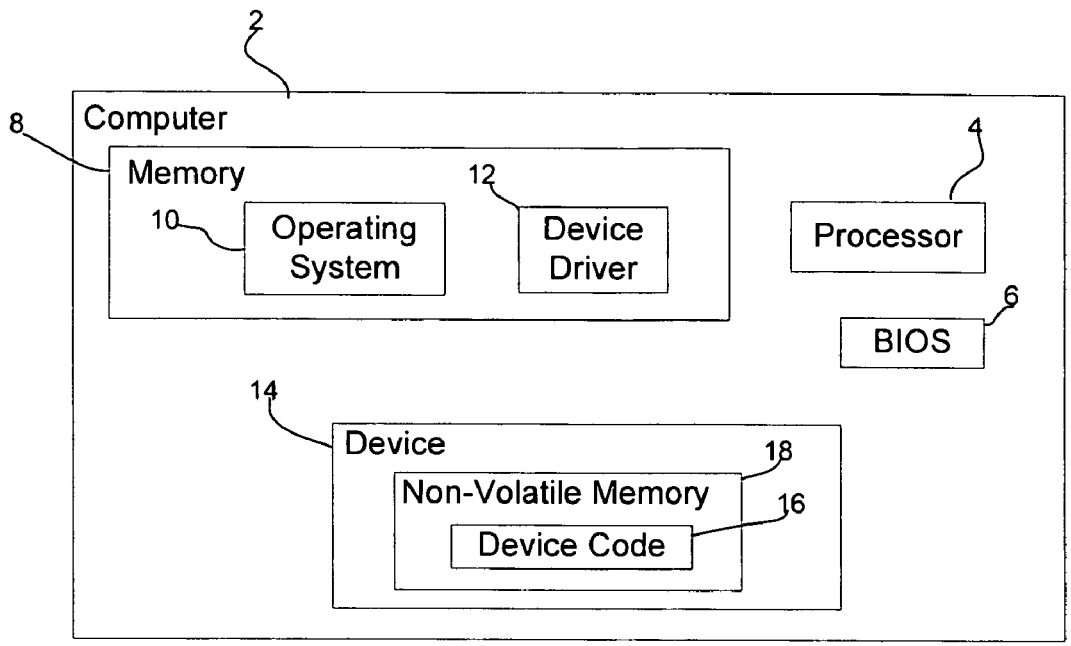
FIG. 1 illustrates an embodiment of a computing environment.

FIG. 1 illustrates a computing environment used with the described embodiments. A computer 2 includes a processor 4 (such as one or more central processing units (CPU)), a basic input/output system (BIOS) 6 including code executed by the processor 4 to initialize and control various computer 2 components (e.g., the keyboard, display screen, disk drives, serial communications, etc.) during a boot sequence. The computer 2 includes a memory 8, comprising one or more memory devices, in which an operating system 10 and a device driver 12 interfacing with an attached device 14 are loaded into the memory 8 implementing a runtime environment. There may be multiple device drivers providing interfaces to multiple attached devices. As part of the boot sequence, the device driver 12 may load device code 16 in a non-volatile memory 18 of the device 14 (e.g., a flash memory, Electronically Erasable Programmable Memory (EEPROM), etc.) into the memory 8. The device 14 may comprise any type of Input/Output (I/O) device internal or external to a housing of the computer 2, such as the case for an internal hard disk drive or video chipset, which may be integrated on the computer 2 motherboard or on an expansion card inserted in an expansion slot on the computer 2 motherboard). The BIOS 6 may be implemented in firmware in a non-volatile memory device on the computer 2 motherboard, such as a Flash memory, Read Only Memory (ROM), Programmable ROM (PROM), etc. The BIOS 6 code indicates the sequence of the boot operations. The operating system 10 may comprise an operating system known in the art, such as a Microsoft® Windows® operating system, Linux™, etc. (Microsoft and Windows are registered trademarks of Microsoft Corporation and Linux is a trademark of Linus Torvalds).

Figure 2:
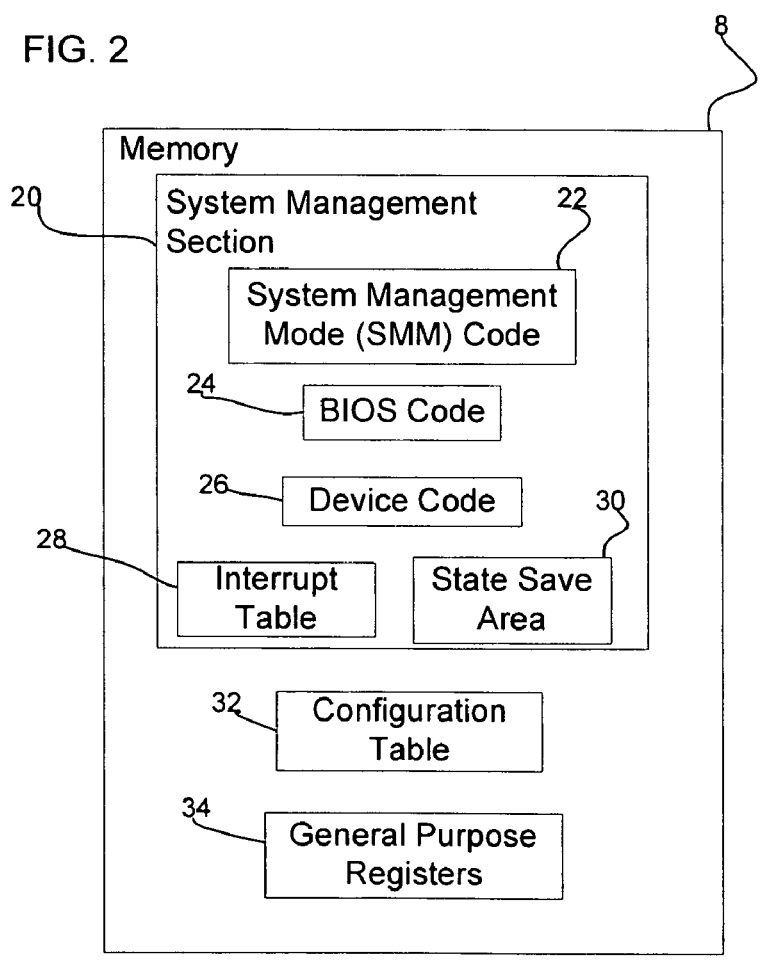
FIG. 2 illustrates an embodiment of components in a memory of the computing environment.

FIG. 2 provides an embodiment of further components in the memory 8, including a system management section 20 that includes code, also referred to as the second mode instructions, and registers used in a system management mode, also referred to as a second mode, where the system management section 20 is not accessible to the operating system 10 operating in a first mode, e.g., long mode or 64 bit mode. The operating system 10 may not be able to see or access the address space of the system management section 20 and instructions, registers and data structures therein. The system management section 20 includes system management code 22 (second mode instructions), which may be loaded by the BIOS 6 during the boot sequence; BIOS code 24, device code 26 loaded from the device 14; an interrupt table 28 associating device interrupts with sections of the device code 26 in the memory 8 implementing the interrupt; and a state save area 30 to which the processor 4 writes state save information on the state of the processor 4 while in the first mode (e.g., 64 bit mode) before switching to operating in a second mode (such as a 16 bit real mode). The system management code 22, or second mode instructions, may comprise instructions that are part of the processor 4 system level architecture and intended to support basic system-level operations such as memory management, interrupt and exception handling, task management, and control of multiple processors.

The memory 8 further includes a configuration table 32, such as an Advanced Configuration and Power Interface (ACPI) table, indicating registered ports and values, such that writing one registered value to the registered port invokes system management mode (SMM) to perform device related operations, such as power management operations, updating or controlling a device, etc. The device driver 12 updates the configuration table 32 with information on an I/O port and value, such that writing to that I/O port with that value causes switching to SMM mode to perform operations with respect to that device 14 in the second mode, e.g., real mode. General purpose registers 34 may be accessed by the processor in the first mode (e.g., 64 bit mode) or the second mode (e.g., 16 bit real mode). Before invoking the system management mode (SMM), the device driver 12 or operating system 10 may write to the general purpose registers 34 arguments for the call and an identifier of the device operation associated with device code to execute. The SMM (second mode) code 22 executes the device code associated with the device operation indicated in the general purpose registers 34. The SMM code 22 may use arguments also included in the registers 34 when executing the device code 26 in the second mode, e.g., 16 bit real mode.

Figure 3:
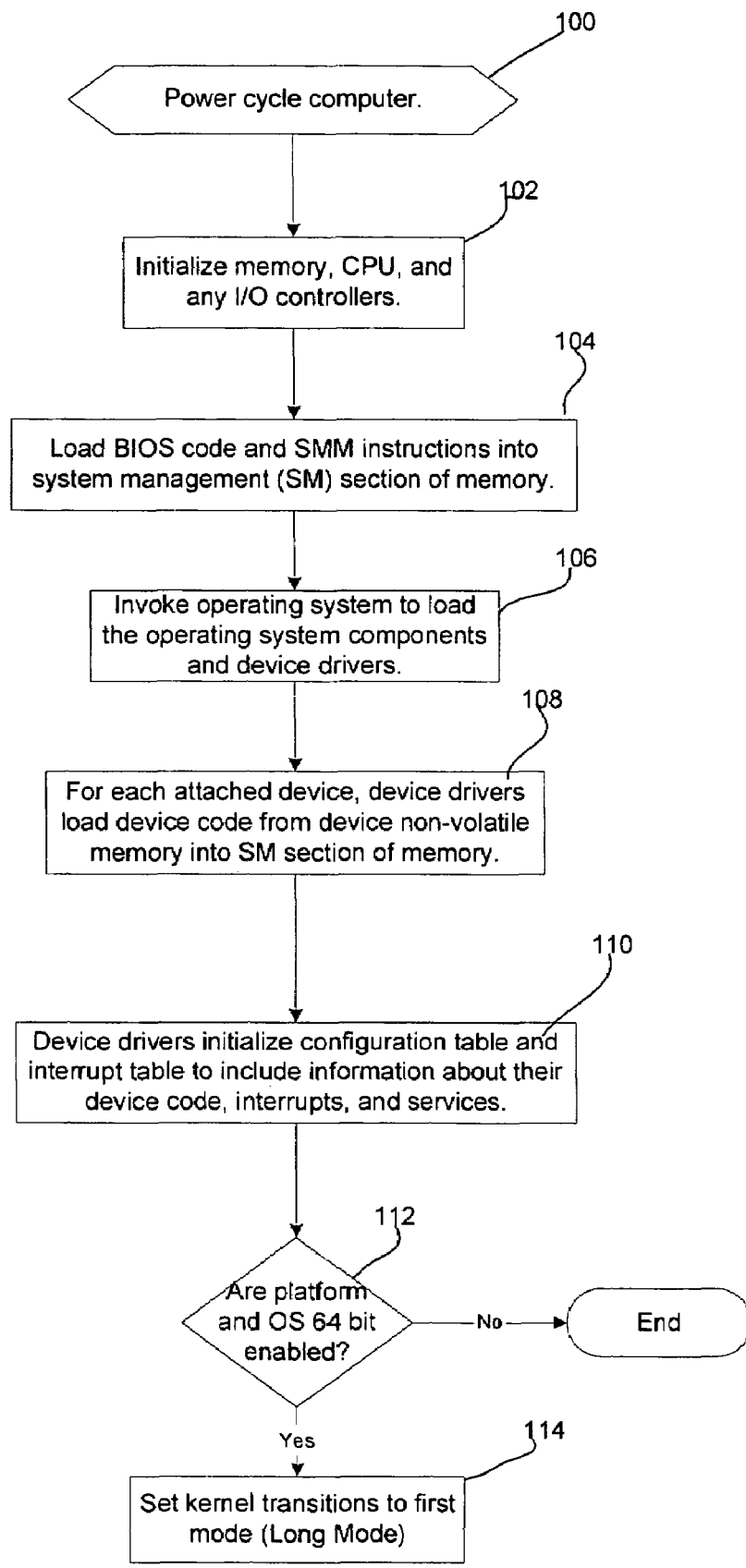
FIG. 3 illustrates an embodiment of operations to initialize information in the memory during an initialization event.

FIG. 3 illustrates an embodiment of operations to initialize information in the system management section 20 during a power cycle or other initialization event to enable switching the processor operations from a first mode, e.g., a 64 bit mode, to a second mode, e.g., 16 bit real mode. Upon an initialization event, such as a cold or warm restart, (at block 100), the processor 4, executing the BIOS 6 code (in real mode or some other mode), initializes (at block 102) the memory 8, the processor 4 registers, and any I/O controllers for attached devices. The processor 4 further loads (at block 104) certain of the BIOS code 6, system management mode (SMM) instructions (second mode instructions), and any other code and data used during SMM operations into the system management (SM) section 22 of memory 8. The operating system 10 is invoked (at block 106) to load the operating system 10 components and device drivers 12. For each attached device 14, the associated device drivers 12 load (at block 108) the device code 16 from the device non-volatile memory 18 into the SM section 20 of the memory 8. The device drivers 12 may further initialize (at block 110) the configuration table 32 and interrupt table 28 to include information about their device code, interrupts, and services. For instance, the device driver 12 may indicate in the configuration table 32 an I/O port and value that a caller may use to change the processor operating mode to execute certain device code 26 operations to control the device 14 associated with the device driver 12. The indicated value in the configuration table 32 may be associated with a buffer in the general purpose registers 34 in which call state information is included for the SMM code 22 to use to execute the appropriate device code 26 to perform the operation invoked by writing to the I/O port with the value indicated in the configuration table 32. The device driver 12 may update an interrupt table 28 to identify the device code 26 in the SM section 20 associated with an interrupt number, so that the SMM code 22 can determine the appropriate device code 26 to execute for the interrupt number indicated with a call. If (at block 112) the operating system 10 and processor 4 are 64 bit enabled, then kernel transitions and processor operations are set (at block 114) to long mode, e.g., 64 bit mode. Otherwise, the initialization procedure ends.

FIG. 4 illustrates an embodiment of operations to process a request to execute device code in a different processing mode. Control begins (at block 200) upon the processor 4 receiving a call to effect execution of device code in a different processor operating mode, e.g., real 16 bit mode. The call may be from the device driver 12 directly. Alternatively, the device driver 12 may make a call to execute certain device code in the real (e.g., second) mode, and the operating system 12 may then generate the call to cause the changing of the processor operating mode to SMM and execute the device code 12 in the second (e.g., real 16 bit) mode. The call may comprise a callback to real-mode comprising an invocation of a 16-bit service call in the BIOS code 24 or an invocation of a 16-bit software interrupt. One example of a 16-bit real mode software interrupt is the Interrupt 10 h (10-hex or 16 decimal) for setting the mode of the video controller. In addition to the call, the operating system 10 or device driver 12 writes (at block 202) call state information indicating arguments and a device operation to at least one buffer, e.g., the general purpose registers 34, accessed by the processor 4 when executing the SMM code 22 in the second mode, i.e., second mode instructions. To effect the operating mode change, the operating system 10 or device driver 12 may write (at block 204) to an I/O port with a value to invoke the processor 4 to switch to the SMM mode (i.e., second mode) to execute the device code 16 in a different, e.g., second (real 16 bit), mode.

The processor determines (at block 206) whether the configuration table 32 includes an entry associating the I/O port and the value subject to the write operation with changing the operating mode of the processor 4. If (at block 206) the configuration table 32 provides this association, then the processor 4 executes (at block 208) a system interrupt to change the processor operating mode from the first mode (e.g., 64 bit) to the second mode (e.g., real mode—16 bit). As part of the state change, the processor 4 saves (at block 210) state information for the first mode operating context in the state save area 30. After changing the state, the processor 4 executes (at block 212) the second mode code 22 to determine a buffer, e.g., general purpose registers 34, associated with the value included in the write to the I/O port, where the buffer may indicate a device operation associated with device code 26 to execute. The processor 4 executes (at block 214) the SMM 22 (second mode) code to execute the device code 26 associated with the device operation indicated in the buffer 34. The SMM code 22 may execute the device operation directly or if the device operation comprises an interrupt, determine from the interrupt table 28 the device code 26 to execute to control the device 14. As discussed, the SMM code 22 is executed in the second (real 16 bit) mode.

The SMM code 22, executing the device code 26 for the device operations, may also write (at block 216) any output data to a buffer, e.g., the general purpose registers 34, accessible to the processor 4 when subsequently executing in the first mode. The output from executing the device code in the second (real) mode may be written to the same or different registers 34 that included the call state information. After executing the device code 26, the SMM code 22 executes (at block 218) an exit instruction to change (at block 220) the state back to the first mode. As part of the state change back to the first mode, the processor 4 may read in data from the state save area 30 to return to the state prior to the state change from the first mode to the second mode. The program from which the initial call was made may then access (at block 222) any return data in the general purpose registers 34.

If (at block 206) the processor does not support a processor/hardware implemented state change for the specific call, then an emulator may be invoked (at block 224) to execute the device code 26 in the first mode having a functionality of the device code. The emulator may include a translator and maps to map a request for a device code instruction intended to be executed in the second (real) mode to corresponding instructions executed in the first mode, e.g., 64 bit mode, to implement the functionality of the device code in the first mode.

Described embodiments provide a technique to enable a hardware state change from a first to a second mode to execute device code in a device non-volatile memory.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a tangible transmission media, such as a network transmission line, wireless transmission media, optical cable, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In one embodiment, the invocation of the SMM code may utilize ACPI tables and the second (real) mode operations may utilize the SMM operating mode, which is part of the Intel Corporation's ("Intel") processor architecture. Further details of the SMM mode are described in the publication from Intel entitled "Intel Architecture Software Developer's Manual, Volume 3: System Programming" (Copyright Intel, 1999). In an alternative embodiment, different vendor protocols may be used to cause a processor/hardware state change to execute device code loaded into memory.

In the described embodiments, the first mode was described as a 64 bit mode and the second mode as a 16 bit real mode. In additional embodiments, the first mode may be a mode other than a 64 bit mode, e.g., 32 bit mode, and the second mode may be a 16 bit mode, or a mode other than a 16 bit mode, such as a 32 bit mode, 8 bit mode, etc.

The illustrated operations of FIGS. 3 and 4 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising: receiving, by a processor, a call while the processor is operating in a first mode, wherein the call is made to effect execution of device code to control an Input/Output (I/O) device, wherein the device code is implemented in a non-volatile memory in the I/O device; loading second mode instructions into a protected second mode section of a computer memory; loading the device code from the non-volatile memory in the I/O device into the second mode section of the computer memory, wherein the device code is executed from the second mode section to the computer memory by the processor operating in the second mode; determining, by the processor, whether the call is intended to change a processor operating mode from the first mode to a second mode; selectively changing the state of the processor to the second mode in which the processor executes second mode instructions loaded in the protected second mode section of the computer memory, wherein the second mode section of the computer memory is inaccessible to an operating system, in response to determining that the call is intended to change the processor operating mode; and executing, by the second mode instructions, the device code to control the I/O device.

2. The method of claim 1, wherein in the first mode, an operand and address sizes are a first bit size and in the second mode, the operand and address sizes are a second bit size.

3. The method of claim 2, wherein the first bit size comprises 64 bits and wherein the second bit size comprises 16 bits.

4. The method of claim 1, further comprising:
selectively generating a system interrupt to change the processor operating mode from the first mode to the second mode in response to determining that the call is intended to change the processor operating mode, wherein the second mode instructions are executed in response to the system interrupt.

5. The method of claim 4, further comprising:
writing call state information to at least one buffer accessible to the processor when operating in the second mode, wherein the call state information indicates arguments and a device operation associated with the device code, wherein the call is received after the state information is written to the at least one buffer, and wherein the second mode instructions access the at least one buffer to determine the device code to execute.

6. The method of claim 4, further comprising:
selectively executing, by the second mode instructions, an exit instruction in response to executing the device code; and
selectively changing the state of the processor to execute in the first mode in response to executing the exit instruction.

7. The method of claim 6, further comprising:
selectively writing data to a buffer in response to executing the device code in the second mode before executing the exit instruction; and
accessing, by instructions executed by the processor in the first mode, data written to the buffer.

8. The method of claim 1, wherein the call comprises writing to an Input/Output port with a value, and wherein determining whether the call is intended to change the processor operating mode comprises determining whether a configuration table associates the I/O port and the value with changing the state mode, further comprising:
using, by the processor executing in the second mode, the value to determine a buffer indicating a device operation associated with device code, wherein executing the device code comprises executing the device code associated with the indicated device operation.

9. The method of claim 1, further comprising:
selectively invoking an emulator to execute the device code in response to determining that the I/O port is not indicated in the table as associated with changing the processor operating mode, wherein the emulator executes code in the first mode having a functionality of the device code.

10. A system, comprising: a processor; an operating system; an Input/Output (I/O) device having non-volatile memory including device code to control the I/O device; a computer memory including second mode instructions in a protected second mode section of the computer memory inaccessible to the operating system; system code executed by the processor, wherein execution of the system code is capable of causing operations to be performed, the operations comprising: loading second mode instructions into a protected second mode section of the computer memory; loading the device code from the non-volatile memory, in the I/O device into the second mode section of the computer memory, wherein the device code is executed from the second mode section of the computer memory by the processor operating in the second mode; receiving a call from the device driver while the processor is operating in a first mode, wherein the call is made to effect execution of the device code to control the I/O device; determining whether the call is intended to change the processor operating mode from the first mode to a second mode; selectively changing the state of the processor to execute in the second mode in which the processor executes the second mode instructions in response to determining that the call is intended to change the processor operating mode; and executing the second mode instruction to execute the device code in the second mode to control the I/O device.

11. The system of claim 10, wherein in the first mode, an operand and address sizes are a first bit size and in the second mode, the operand and address sizes are a second bit size.

12. The system of claim 10, wherein the processor executes the system code to further perform:
selectively generating a system interrupt to change the processor operating mode from the first mode to the second mode in response to determining that the call is intended to change the processor operating mode, wherein the second mode instructions are executed in response to the system interrupt.

13. The system of claim 12, wherein the I/O device further includes a non-volatile memory in which the device code is implemented, further comprising: a device driver, wherein the device driver loads the device code from the non-volatile memory in the I/O device into the second mode section of the computer memory, wherein the device code is executed from the second mode section of the computer memory by the processor operating in the second mode; and wherein the system code is executed by the processor to further perform loading second mode instructions in a second mode section of the computer memory.

14. The system of claim 12, further comprising:
a device driver;
wherein the operating system or device driver further perform writing call state information to at least one buffer accessible to the processor when operating in the second mode, wherein the call state information indicates arguments and a device operation associated with the device code, wherein the call is received after the state information is written to the at least one buffer, and wherein the second mode instructions access the at least one buffer to determine the device code to execute.

15. A system, comprising:
a processor;
an operating system;
an Input/Output (I/O) device having a non-volatile memory including device code to control the I/O device;
a computer memory including second mode section of the computer memory inaccessible to the operating system; system code executed by the processor, wherein execution of the system code is capable of causing operations to be performed, the operations comprising:
loading second mode instructions into a protected second mode section of the computer memory;
loading the device code from the non-volatile memory in the I/O device into the second mode section of the computer memory, wherein the device code is executed from the second mode section of the computer memory by the processor operating in the second mode;
receiving a call from the operating system while the processor is operating in a 64 bit mode, wherein the call is made to effect execution of the device code to control the I/O device;
determining whether the call is intended to change a processor operating mode from the 64 bit mode to a real bit mode;
selectively changing the state of the processor to execute in a real mode in response to determining that the call is intended to change the processor operating mode; and
executing the device code in the real mode to control the I/O device.

16. The system of claim 15, wherein in the first mode, an operand and address sizes are 64 bits and in the real mode, the operand and address sizes are 16 bits.

17. An article of manufacture comprising code in a computer readable storage medium executed by a processor in communication with a Input/Output (I/O) device having a non-volatile memory including device code to control the I/O device and with a protected second mode section of computer memory including second mode instructions inaccessible to an operating system, wherein the code is executed by the processor to perform operations comprising: loading second mode instructions into the protected second mode section of the computer memory; loading the device code from the non-volatile memory in the O/I device into the second mode section of the computer memory, wherein the device code is executed from the second mode section of the computer memory by the processor operating in the second mode; receiving a call while the processor is operating in a first mode, wherein the call is made to effect execution of device code to control the I/O device; determining whether the call is intended to change the processor operating mode from the first mode to a second mode; selectively changing the state of the processor to execute in a second mode in which the processor executes the second mode instructions in response to determining that the call is intended to change the processor operating mode; and executing the second mode instructions to execute the device code in the second mode to control the I/O device.

18. The article of manufacture of claim 17, wherein in the first mode, an operand and address sizes are a first bit size and in the second mode, the operand and address sizes are a second bit size.

19. The article of manufacture of claim 18, wherein the first bit size comprises 64 bits and wherein the second bit size comprises 16 bits.

20. The article of manufacture of claim 17, wherein the code includes second mode instructions, wherein the operations further comprise:
selectively generating a system interrupt to change the processor operating mode from the first mode to the second mode in response to determining that the call is intended to change the processor operating mode, wherein the second mode instructions are executed in response to the system interrupt.

21. The article of manufacture of claim 20, wherein the operating system or a device driver writes call state information to at least one buffer accessible to the processor when operating in the second mode, wherein the call state information indicates arguments and a device operation associated with the device code, wherein the call is received after the state information is written to the at least one buffer, and wherein the second mode instructions access the at least one buffer to determine the device code to execute.

22. The article of manufacture of claim 20, wherein the operations further comprise:
   selectively executing, by the second mode instructions, an exit instruction in response to executing the device code; and
   selectively changing the state of the processor to execute in the first mode in response to executing the exit instruction.

23. The article of manufacture of claim 22, wherein the operations further comprise:
   selectively writing data to a buffer in response to executing the device code in the second mode before executing the exit instruction, wherein the processor is capable of accessing data written to the buffer in the first mode.

24. The article of manufacture of claim 17, wherein the call comprises writing to an Input/Output port with a value, and wherein determining whether the call is intended to change the processor operating mode comprises determining whether a configuration table associates the I/O port and the value with changing the state mode, wherein the operations further comprise:
   using, by the processor executing in the second mode, the value to determine a buffer indicating a device operation associated with device code, wherein executing the device code comprises executing the device code associated with the indicated device operation.

25. The article of manufacture of claim 17, the code is in communication with an operating system having an emulator, wherein the operations further comprise:
   selectively invoking the emulator to execute the device code in response to determining that the I/O port is not indicated in the table as associated with changing the processor operating mode, wherein the emulator executes code in the first mode having a functionality of the device code.

\* \* \* \* \*

UNITED STATES PATENT AND TRADEMARK OFFICE
CERTIFICATE OF CORRECTION

PATENT NO. : 7,581,037 B2  
APPLICATION NO. : 11/081238  
DATED : August 25, 2009  
INVENTOR(S) : Zimmer et al.

Page 1 of 1

It is certified that error appears in the above-identified patent and that said Letters Patent is hereby corrected as shown below:

In the Claims

Claim 9, Column 6, Line 66, "that the I/O port" should read --that an I/O port--.

Claim 9, Column 6, Line 67, "in the table" should read --in a table--.

Claim 10, Column 7, Line 5, "having non-volatile" should read --having a non-volatile--.

Claim 10, Column 7, Line 14, "memory, in the" should read --memory in the--.

Claim 10, Column 7, Lines 21-22, "change the processor" should read --change a processor--.

Claim 17, Column 8, Line 32, "with a Input/Output" should read --with an Input/Output--.

Claim 17, Column 8, Line 34, "section of computer" should read --section of a computer--.

Claim 17, Column 8, Line 40, "the O/I device" should read --the I/O device--.

Claim 17, Column 8, Line 47, "change the processor" should read --change a processor--.

Claim 25, Column 10, Line 19, "the the I/O port" should read --that an I/O port--.

Claim 25, Column 10, Line 20, "in the table" should read --in a table--.

Signed and Sealed this  
Third Day of March, 2015

Michelle K. Lee  
*Deputy Director of the United States Patent and Trademark Office*